United States Patent Office 3,843,434
Patented Oct. 22, 1974

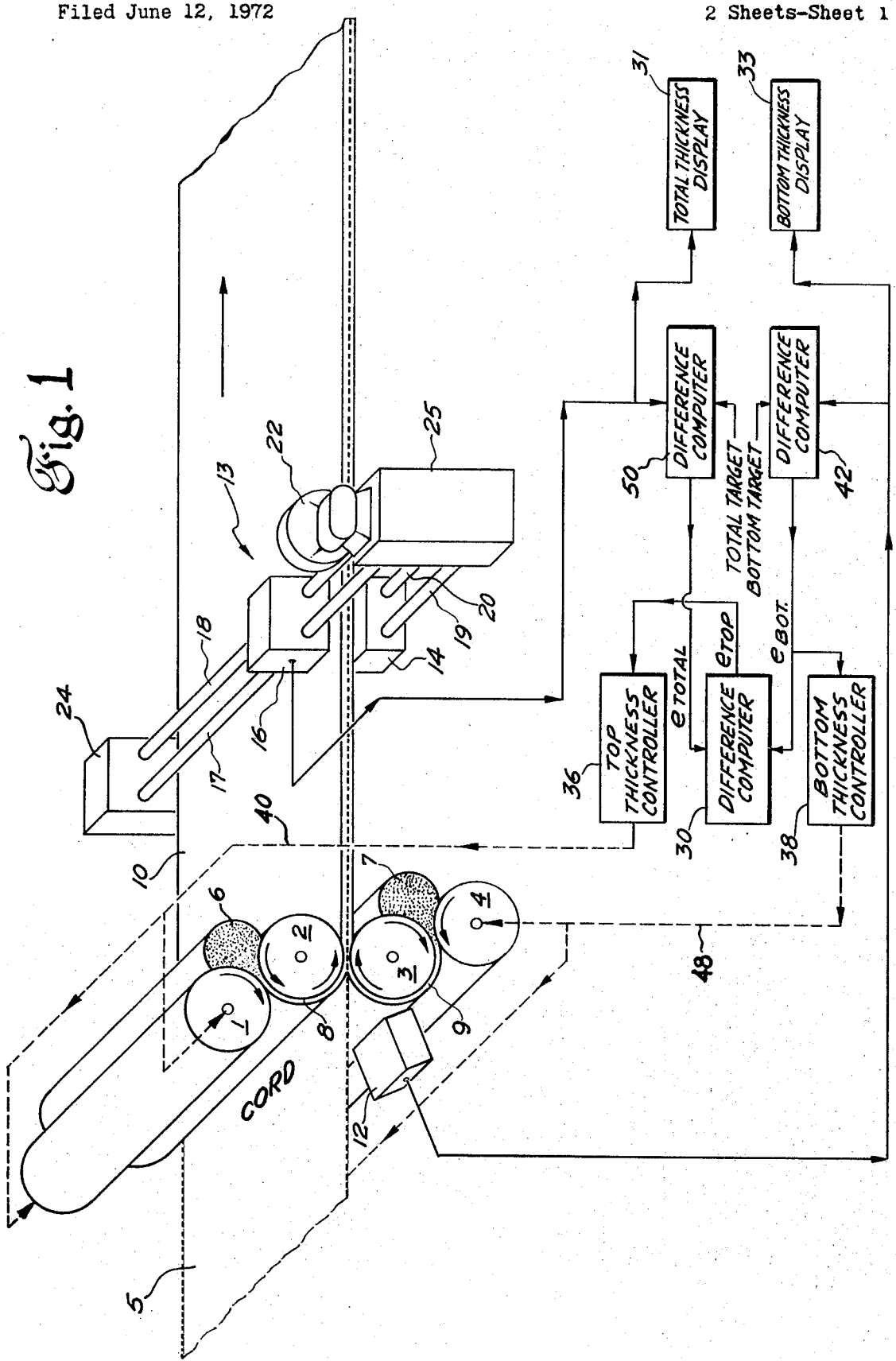

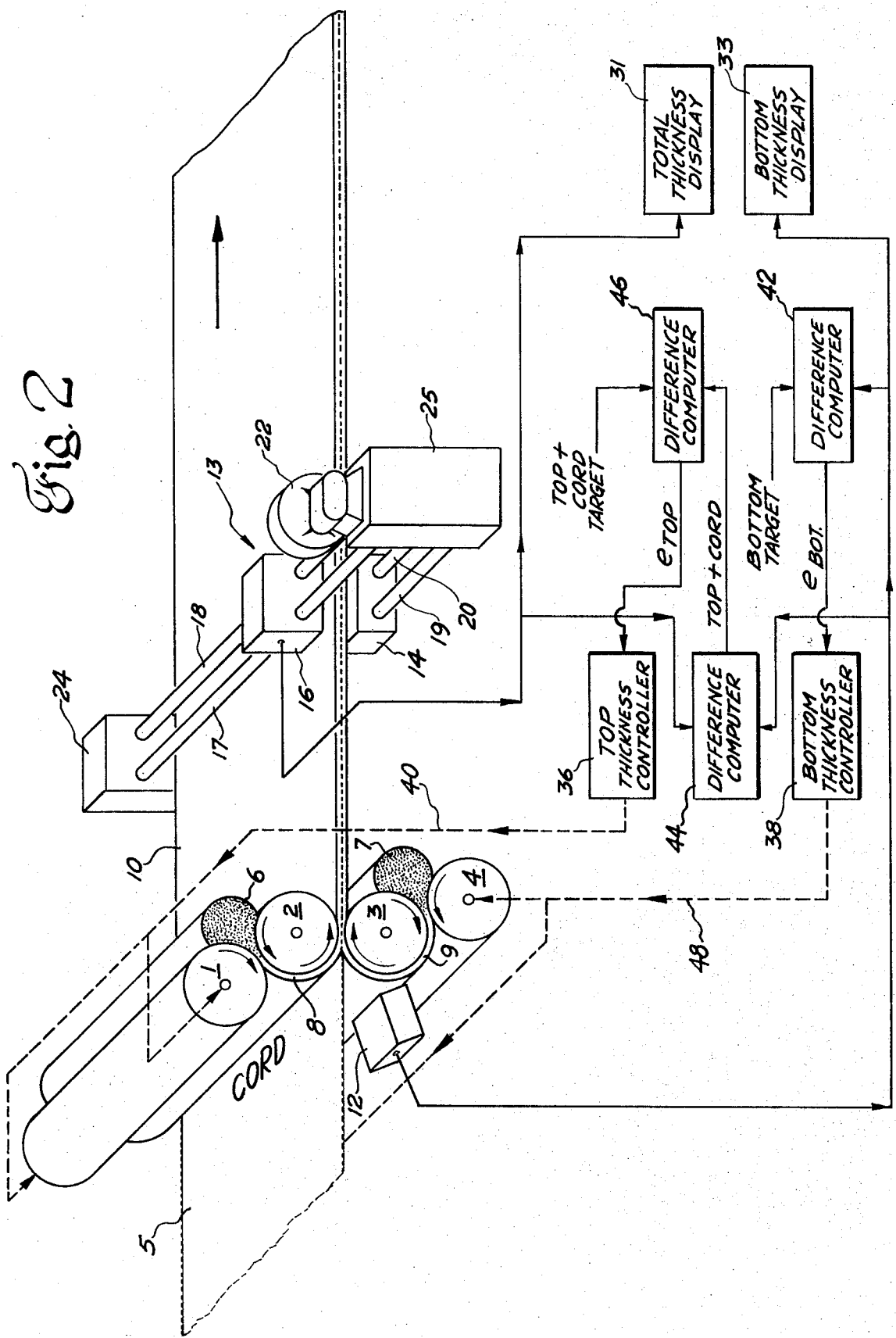

3,843,434
PROCESS CONTROL
Robert Lee Heiks, Columbus, Gerald A. Lasson, Dublin, and Robert Eugene McCall, Columbus, Ohio, assignors to Industrial Nucleonics Corporation
Filed June 12, 1972, Ser. No. 262,000
Int. Cl. B29h 9/02, 17/02
U.S. Cl. 156—110
24 Claims

ABSTRACT OF THE DISCLOSURE

A process monitoring and control system is provided for use in a tire calendering system producing rubber tire material comprising a layer of tire cord laminated between first and second layers of rubber. In a preferred embodiment, the thickness of the first rubber layer is measured by a single point radiation backscatter gauge at a point prior to its lamination with the tire cord and the second layer. The thickness of the first layer is controlled to a desired target by means of a control loop including the single point gauge. The total thickness of the combined layers is measured at the calender output by a total thickness gauge. Means are included to control the thickness of the second layer to maintain the total thickness at a desired total thickness target, in such a way as to eliminate any error in the thickness of the first layer as a factor affecting the control of total thickness. In this manner, the desired total thickness of the calendered material and the desired position of the tire cord between the first and second rubber layers are maintained.

PROCESS CONTROL

The present invention relates generally to a tire calendering system for the production of rubber tire material comprising a layer of tire cord laminated between two layers of rubber, and more particularly, to an apparatus and method for monitoring and controlling a tire calendering system to produce rubber tire material having a desired total thickness and cross-section.

CROSS REFERENCE TO RELATED APPLICATIONS

The present invention relates to the inventions disclosed in the co-pending applications entitled "Process Control" of J. Donoghue et al., "Measuring Gauge" of J. Donoghue, and "Process Control System" of J. Donoghue et al., all assigned to the assignee of the present invention and filed on even date herewith.

BACKGROUND

In the rubber tire calendering art, control of the manufactured sheet of tire material within precise limits is of highly significant concern. The production of rubber-coated cord within close tolerances is critical both from the standpoint of the quality of the manufactured article-optimum tire appearance, controllability, safety, and longevity—and from the standpoint of reducing the costs associated with production—minimized use of raw materials, minimized production of off-spec material, and minimized unproductive machine and manpower time. A further significant result of more accurate production control is the potential for a higher production rate brought about by a heightened confidence in the ability of the system to meet target specifications.

In the usual tire calendering process, a tire cord, comprising a layer of textile, metallic, or synthetic material, is forcibly laminated between two layers of rubber by means of opposing calender rolls. These layers are usually of equal thickness, though, of course, this need not be the rule. The positioning of the tire cord within the rubber tire material laminate must be precisely controlled within close tolerances, for the reasons given above relating to tire quality and production economics. Assurance that such positioning is in fact attained is had by maintaining a relatively constant thickness in the rubber layers above and below the tire cord. In addition to the exact positioning of the cord within the rubber layers, it is also highly important that the total thickness of the calendered tire material be maintained as close as possible to a selected total thickness target. This is necessary both from the point of view of the tire building process, for whch the tire material is preferably at a constant total thickness, as well as the ultimate quality of the finished tire, in that a tire having insufficient rubber will not wear properly whereas one having an excess of rubber will be subject to excessive heat build-up from internal friction forces.

In referring to the amount of rubber deposited on either side of the tire cord, the terms "thickness" and "weight" are used interchangeably in the rubber art, since if the density of the rubber material is known, its thickness can readily be calculated from a measurement of its weight per unit area. To simplify the presentation which follows, the term "thickness" will be used exclusively, with the express reservation that alternative forms of measurement are not thereby relinquished.

It is known in the tire calendering art to monitor the total thickness of the rubberized cord leaving the tire calender rolls and to apply corrective feedback control, if necessary, to the calender system. In one form of calender control system, a scanning gauge is located at the calender output to provide an indication of the average total thickness of the calendered material. Such indication is compared to a total thickness target, and any error is divided between separate controllers for the top and the bottom rubber layers. While this system may maintain the total thickness of the calendered material relatively constant, it is not always capable of controlling the position of the tire cord with respect to the top and bottom layers.

Other calender control systems are known which are concerned with the control of tire cord position as well as the control of total thickness. For example, one device, described in U.S. Pat. No. 2,750,986, issued June 19, 1956 to R. W. Russell et al., uses for beta-ray transmission gauges, two of which measure bottom thickness, the other two total thickness, in a two-stand rubber calendering system. The bottom thickness gauges form part of a control loop controlling bottom thickness by means of adjustments to the bottom layer calendering rolls; similarly, the total thickness gauges form part of a control loop for adjusting the calendering rolls associated with the top layer. The two gauges associated with each pair of calender rolls adjust the calender roll spacing according to whether the measured thickness is below or above specifications. A deficiency inherent in this system is that the gauges which measure and control thickness are all single point gauges. That is, they measure thickness from fixed positions which ignore any variations in the cross-direction (edge-to-edge) profile of the material. Further, these gauges are located relatively distant from the calender rolls, necessitating a relatively lengthy transport delay between successive control actions.

Another known calendar control system, used in conjunction with a common Z-type calendar, utilizes three single point thickness gauges on each of the top and bottom pairs of rolls for measuring top and bottom layer thickness respectively, and a scanning beta-ray transmission gauge downstream of the calender for measuring total thickness. The single point gauges compare the measured top and bottom thicknesses with corresponding target thicknesses in order to independently control the thicknesses of the top and bottom layers. The scanning gauge measures deviations of total thickness for a total thickness target and corrects the top and bottom setpoints associated with the single point gauges in the directions necessary to regain compliance with the total thickness setpoint. While this calender control system is not subject to the objections of the aforementioned system, it requires a multiplicity of single point gauges, with their concomitant problems of maintenance and cost. Moreover, it requires a total of three separate gauging subsystems for the top, bottom, and total thickness measurements, respectively.

A further known system utilizes single point gauges adjacent one of the bottom pair of calender rolls in a Z-calender to measure bottom thickness and control the same to a bottom thickness target by means of a bottom thickness control loop, including adjustable screwdown between the bottom rolls. In addition, a scanning total thickness gauge at the calender output controls total thickness to a total thickness target by controlling the thickness of the top layer independently of the bottom thickness control. This calender control system, although not subject to transport delay problems with respect to bottom thickness control, tends to over or under-correct for bottom thickness errors, since both control loops may react in response to a bottom thickness error.

In yet another known system, described in U.S. Pat. No. 3,405,267, issued Oct. 8, 1968 to W. E. Chope, assigned to the assignee of the present application, radiation backscatter gauges located on either side of the final laminated strip are used to provide an indication of the relative balance between the top and bottom rubber layers, which indication may be used as the basis of suitable calender control.

Applicants' method and apparatus for monitoring and controlling a tire calender system, in contrast to prior art tire calender monitor and control systems, has the advantage of requiring only two gauges to maintain the total thickness at a selected total thickness target and to maintain a desired position of the tire cord within the calendered material, thus eliminating a substantial source of hardware and maintenance costs. Importantly, bottom thickness control is not subject to double correction, as in certain of the aforementioned systems, since the bottom thickness and total thickness control loops are interconnected so as to eliminate bottom error as a factor affecting total thickness control.

In addition, applicants' unique gauging configuration permits the thickness of the bottom layer to be controlled nearly instantaneously to the bottom thickness target, since there is practically no transport delay between the location at which corrective control action is applied with respect to bottom thickness and the location of a single point bottom thickness gauge.

Moreover, the invention embodies the highly desirable feature of locating at least one gauge, here a scanning gauge, downstream from the laminating rolls, so that the final combined thickness of the top layer, tire cord, and bottom layer, which heretofore in the process cannot be reliably determined because of the unpredictable effect of the laminating rolls and because of variations in the tire cord thickness, may be measured with the confidence that it has reached substantially its final value.

The present invention offers a unique and precise solution to the tire calendering problem of maintaining a desired bottom thickness, total thickness, and tire cord position relative to the top and bottom layers of rubber, as will be apparent from a reading of the description which follows.

SUMMARY OF THE INVENTION

We provide a tire calender monitor and control apparatus which automatically controls the tire calendering process to conform the total thickness of the calendered material to a desired target and to maintain the tire cord at a desired spacing within the calendered material.

According to one embodiment, in which a standard four-roll rubber calender is employed, a single point thickness gauge is positioned adjacent one of the bottom pair of calender rolls to provide an indication of the thickness of the bottom rubber layer as it passes over the roll prior to the point of lamination with the cord and the top rubber layer. A scanning thickness gauge is positioned downstream from the calender to provide an indication of the total thickness of the combined layers. A difference computer subtracts the indication of bottom thickness from a bottom thickness target to provide an indication of bottom error. The indication of total thickness is subtracted from a total thickness target, in another difference computer, to provide an indication of total error. The bottom error indication is subtracted from the total error indication in yet another difference computer to provide an indication of top error.

Maladjustments in the calendering process are corrected automatically by means of thickness controllers for the top and bottom rubber layers. A bottom thickness controller, in response to the bottom error indication, adjusts movable control elements on the bottom pair of calender rolls to reduce the bottom error substantially to zero. A top thickness controller, in response to the top error, adjusts movable control elements on the top pair of calender rolls to reduce the top error substantially to zero. Visual indications of the bottom and total thickness are provided to the calender operator.

According to another embodiment, the separate indications of bottom thickness and total thickness are compared in a difference computer to provide an indication of top thickness plus tire cord thickness, which indication is compared with a target representing the combined desired thickness of the top layer and the tire cord to give a top error indication. A top thickness controller, in response to the top error indication, controls adjustable control elements on the top pair of calender rolls to bring the combined thickness of the top layer and tire cord substantially to target. A bottom thickness controller controls the thickness of the bottom layer in response to the bottom error. Visual indications of bottom and total thickness may be provided as before. The targets for top and bottom thickness add up essentially to the total thickness target.

OBJECTS OF THE INVENTION

Accordingly, it is an object of the present invention to provide an improved tire calender control system, which maintains a desired total thickness and cross-section in the calendered material, and requires a minimum number of gauges.

It is another object of the present invention to provide an improved tire calender control system in which substantially no transport delay occurs between successive bottom thickness control actions.

It is still another object of the present invention to provide an improved tire calender control system in which an indication of top thickness error is obtained by subtracting an indication of bottom thickness error from an indication of total thickness error, which indication of top thickness error is used for control purposes.

It is yet another object of the present invention to provide an improved tire calender control system in which an indication of combined top thickness and tire cord thickness is obtained by subtracting a measured indication of bottom thickness from a measured indication of total thickness, which indication of combined top thickness and tire cord thickness is used for control purposes.

Further objects and advantages will become apparent from the following detailed description of the preferred apparatus according to the invention, taken in conjunction with the appended drawing.

BRIEF DESCRIPTION OF FIGURES

FIG. 1 is a partially perspective and a partially schematic view of a tire calender apparatus in combination with an improved tire calender monitor and control system according to one embodiment of the invention.

FIG. 2 is a partially perspective and a partially schematic view of a tire calender apparatus in combination with an improved tire calender monitor and control system according to another embodiment of the invention.

TIRE CALENDERING PROCESS

With reference now to FIG. 1, a typical 4 roll tire calender includes a top pair of coacting calender rolls 1 and 2, supporting a bank 6 of rubber at the input side thereof, and forming a top layer of rubber 8 insubstantially continuous fashion at their output side. A corresponding pair of bottom calender rolls 3 and 4 support a bank 7 of rubber at the injut side thereof and form a bottom layer of rubber 9 at their output side. The top layer 8 and bottom layer 9, together with the tire cord layer 5, form a composite sheet of tire material 10 as they pass through laminating rolls 2 and 3. Adjustable control elements, such as screwdown or hydraulic elements, at either end of the top and bottom pairs of calender rolls (not shown) may be actuated to vary the roll spacing to increase or decrease the thickness of top layer 8 and bottom layer 9.

THICKNESS GAUGES

A single point radiation backscatter gauge 12 is positioned adjacent one of the laminating rolls 2 or 3 to measure the thickness of the rubber layer passing over it prior to lamination with the tire cord and other rubber layer. In a preferred embodiment, the single point gauge 12 is positioned adjacent the lower of the two laminating rolls, roll 3, to measure the instantaneous thickness of the bottom rubber layer 9. Single point gauge 12 is placed at a transverse position along roll 3, such that it measures representative machine direction variations. The optimum location may be determined experimentally. Single point gauge 12 need not be limited to the radiation backscatter type, as it may be of any type suitable for measuring the thickness of a layer of material moving over a roll.

A scanning radiation transmission gauge 13, consisting of a radiation source 16 mounted for traversing movement on the pair of upper guide rails 17 and 18, and a radiation detection unit 14 mounted for traversing movement across the material strip on lower guide rails 19 and 20, is located at the output side of laminating rolls 2 and 3. The source and detector units 16 and 14, respectively, are traversed by means of a motor 22 powering a drive chain (not shown) attached to the source and detector units 16 and 14 and extending between transmission gauge supports 24 and 25 situated on either side of the rubber material strip 10.

The scanning gauge 13 need not scan the entire width of the strip of rubber 10, but in a preferred embodiment, in order to measure a sufficiently representative portion of the strip 10, it is in fact programmed to scan substantially the entire width of the sheet 10. Moreover, should averaging of the instantaneous total thickness indications be deemed necessary or desirable, a wide scan will ensure an accurate indication of average total thickness. Scanning gauge 13 need not be limited to a radiation transmission gauge but may be of any other well known type for measuring the thickness of material.

The separate values of bottom and total thickness are made visible to the tire calender operator by means of thickness display means 31 and 33, which may be any well known strip recorders, meters, or analog-to-digital display means for displaying an instantaneous analog signal. The display means may contain means for averaging or smoothing the instantaneous values of thickness over time, or may contain means for sampling the instantaneous values of the thickness periodically. Visual display means 31 and 33 provide the calender operator with a reliable real-time check on the automatic control functions of the calendering system.

AUTOMATIC CALENDER CONTROL

As seen in FIG. 1, the instantaneous indication of bottom thickness provided by single point gauge 12 is compared with a selected bottom thickness target in a difference computer 42, which calculates an indication of bottom error $e_{BOT}$. Bottom thickness controller 38, in response to the indication of bottom error $e_{BOT}$, effects a bottom layer control action between rolls 3 and 4, represented by dotted line 42, to increase or decrease the thickness of bottom layer 9 in order to reduce the bottom error indication $e_{BOT}$ substantially to zero, depending upon the amount of apparatus inertia, deadbands, and other factors affecting control response.

The frequency of bottom thickness control actions is determined by the time required to calculate and output the necessary corrections to roll 4 plus the slight transport delay time between single point gauge 12 and the point at which the corrections are applied. Because the error calculation and correction times, under normal operating conditions, are short, and because the transport delay time is very small, the bottom layer thickness can be controlled frequently and substantially instantaneously to target.

To effect automatic control of total thickness to a selected total thickness target, the instantaneous indication of total thickness provided by gauge 13 is compared with the total thickness target in difference computer 40, which calculates an indication of total error $e_{TOTAL}$. The indication of bottom error $e_{BOT}$ from different computer 42 is compared with the indication of total error $e_{TOTAL}$ in a difference computer 30, which outputs an indication of top error $e_{TOP}$. Top thickness controller 36, responsive to the top error indication $e_{TOP}$, effects a top layer control action between rolls 1 and 2, shown by dotted line 40, to alter the spacing between rolls 1 and 2 in the appropriate direction to reduce the top error indication substantially to zero.

Besides maintaining a desired total thickness, the position of the tire cord is maintained relatively constant with respect to the top and bottom rubber layers, since the thickness of the bottom layer is maintained essentially constant, while the thickness of the top layer varies only to the degree that variations in the thickness of the tire cord, temperature changes, or other process variations may cause a change in the total thickness.

With the assurance that the bottom error $e_{BOT}$ will be corrected by the bottom thickness feedback control loop, the bottom error $e_{BOT}$ is eliminated as a factor in calculating the necessary correction to be applied to the top layer thickness required to conform the total thickness to target, thereby avoiding double correction of bottom thickness. Moreover, the number of gauges required to maintain both tire cord balance and total thickness is kept to a minimum, resulting in substantial cost savings over calendar control systems of the prior art.

With reference now to FIG. 2, another embodiment of applicants' invention is shown. According to this embodiment, bottom thickness is controlled essentially as in the aforementioned embodiment described with reference to FIG. 1. Indications of bottom thickness and total thickness are also displayed as before.

As an alternative to the control of top thickness based upon a top error derived as a function of the difference between total error and bottom error, FIG. 2 shows an embodiment in which the combined thickness of the top layer 8 plus the layer of tire cord 5 is controlled to a desired target, which target is chosen such that it together with the bottom target equals the desired total thickness target. To this end, the indication of bottom thickness provided by single point gauge 12 is compared with the indication of total thickness given by total thickness gauge 13 in a difference computer 46 to provide an indication of the combined thickness of the top layer 8 and the cord layer 5. This indication is compared in difference computer 46 with a target representing the desired total thickness target minus the desired bottom thickness target, i.e., representing the desired thickness in the combined top and cord layers, to provide an indication of top error $e_{TOP}$. A top thickness controller 36, in response to the top error indication $e_{TOP}$, outputs corrections to roll 1, essentially as described with respect to the embodiment of FIG. 1.

While a preferred embodiment of the invention has been shown and described together with various other embodiments, it will be apparent to one skilled in the art that numerous modifications may be made thereto without departing from the scope and intent of the invention as recited in the appended claims. For example, the instantaneous values of bottom and total thickness measured by gauges 12 and 13, respectively, may be averaged by suitable averaging means (not shown) to obtain representations of bottom and total thickness which reflect a smoothing of the measured values over time. This may result in a more accurate and more representative thickness indication. The indication of bottom thickness measured by gauge 12 may be averaged, for example, over a predetermined time interval, which may coincide with the time of one side-to-side traversal of strip 10 by gauge 13 or a multiple thereof. Reference may be had, with respect to an embodiment involving the coordinated measurements of the bottom and total thickness, to the aforementioned application entitled "Process Control" of J. Donoghue et al., filed herewith. The indication of total thickness measured by gauge 13 may likewise be averaged, for example, over one or more traversals of sheet 10.

It will be understood that means, not shown, may be employed to delay the corrective action by controller 36 until a time equal to the transport delay time between the calender and the location of the scanning gauge 13 has elapsed since the preceding corrective action.

The total thickness target is set according to the desired total thickness of the laminated tire material, consisting of the tire cord and upper and lower rubber layers. The actual value used in the calender control system will be dependent upon the composition of the tire cord and rubber, the geometry of the gauge setup, the type of radiation, and other factors affecting transmissivity.

While the figures show the control corrections to either end of roll 1 and 4 to be equal in magnitude in the preferred embodiment, separate gain factors may be built into controllers 36 and 38 allowing for unequal control correction actions in order to acount for irregularities in the roll surfaces or in the response of the control elements.

It will be further apparent that the various targets need not remain fixed, but may be altered according to the statistical variance of measured thickness, in the manner disclosed in U.S. Pat. No. 3,515,860, issued June 2, 1970 to C. T. Fitzgerald, Jr. and assigned to the same assignee as the present application. By the application of this technique, known as "target optimization control," the degree of controllability of the tire calendering process is automatically sensed, and the process is automatically operated closer to or further from the predetermined target thickness, depending on the controllability as determined by the statistical variance of the process.

It is to be understood that a digital computer may be employed to carry out the averaging, subtracting, and target-comparing functions, as well as the delaying of consecutive control actions initiated by controller 36 on account of transport delay considerations.

We claim:

1. Apparatus for automatically controlling a tire calender to maintain a desired thickness profile in a strip of laminated sheet material comprising first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing an indication of the thickness of said first layer of rubber, first comparison means for comparing said first layer thickness indication with a first layer target to provide a first layer error indication, first controller means responsive to said first layer error indication for actuating said adjustable elements associated with said first pair of coacting calender rolls, to maintain said first layer thickness substantially at said first layer target, second measuring means located at the strip output side of said adjoining calender rolls for providing an indication of the total thickness of said strip, second comparison means for comparing said total thickness indication with a total thickness target to provide a total error indication for said laminated strip, third comparison means for comparing said first layer error indication with said total error indication to provide an error indication for said second layer, and second controller means responsive to said second layer error indication for actuating said adjustable elements associated with said second pair of coacting calender rolls, to maintain said total thickness substantially at said total thickness target.

2. Apparatus according to claim 1, wherein the first controller means is substantially instantaneously responsive to the indication derived from the first measuring means and further including means for traversing said second measuring means in a direction between the edges of said strip and means for deriving the indication of total thickness as an indication of the average total thickness across at least a significant portion of the width of said strip.

3. Apparatus for automatically controlling a tire calender to maintain a desired thickness profile in a strip of laminated sheet material comprising first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of second layer of rubber, and in which said layer of tire cord is laminated between said first and second layers of rubber by adjoining calender rolls, said apparatus comprising first measuring means located in a fixed position adjacent one of said adjoining calender rolls at the input side thereof for providing an indication of the thickness of said first layer of rubber, first controller means responsive to said first layer thickness indication for actuating said adjustable elements associated with said first pair of coacting calender rolls to maintain said first layer thickness substantially at a first layer target, second measuring means located at the strip output side of said adjoining calender rolls for providing an indication of the total thickness of said strip, means responsive to said indications of first layer thickness and total thickness for providing a resultant indication of the combined thicknesses of said second layer and said tire cord, and second controller means responsive to said resultant indication for actuating said adjustable elements associated with said second pair of coacting calender rolls to maintain the combined thicknesses of said second layer and said tire cord substantially at a second target, the sum of said first layer target and said second target being equal to a desired total thickness target, whereby said total thickness is maintained substantially at said total thickness target.

4. Apparatus according to Claim 3 wherein the first controller means is substantially instantaneously responsive to the indication derived from the first measuring means and further including means for traversing said second measuring means in a direction between the edges of said strip and means for deriving the indication of total thickness as an indication of the average total thickness across at least a significant portion of the width of said strip.

5. Method for maintaining a desired thickness profile in a moving strip of laminated sheet material produced in a tire calendering process, said sheet material comprising a first layer of rubber, a second layer of rubber, and an intermediate layer of tire cord, said method comprising
measuring the thickness of said first layer of rubber as it passes a point prior to lamination with said second layer of rubber and said tire cord to provide an indication of the thickness of said first layer of rubber,
comparing said first layer thickness indication with a first layer target to provide a first layer error indication,
controlling said first layer thickness substantially to said first layer target in response to said first layer error indication,
measuring the thickness of said laminated strip subsequent to the lamination of said first and second rubber layers with said tire cord to provide an indication of the total thickness of said laminated strip,
comparing said total thickness indication with a total thickness target to provide a total error indication for said laminated strip,
comparing said first layer error indication with said total error indication to provide a resultant error indication for said second layer, and
controlling said second layer thickness in response to said second layer error indication, whereby said total thickness is maintained substantially at said total thickness target.

6. The method of Claim 5, wherein the thickness of said laminated strip is measured at a plurality of points across the width of said strip, and averaging the measurements from the plurality of points to provide an indication of the average total thickness of said strip.

7. The method of Claim 5, wherein said first layer thickness is controlled at more frequent intervals than said total thickness is controlled.

8. Method for maintaining a desired thickness profile in a moving strip of laminated sheet material produced in a tire calendering process, said sheet material comprising a first layer of rubber, a second layer of rubber, and an intermediate layer of tire cord, said method comprising
measuring the thickness of said first layer of rubber as it passes a point prior to lamination with said second layer of rubber and said tire cord to provide an indication of the thickness of said first layer of rubber,
controlling said first thickness substantially to a first layer target in response to said first layer thickness indication,
measuring the thickness of said laminated strip subsequent to the lamination of said first and second rubber layers with said tire cord to provide an indication of the total thickness of said laminated strip,
comparing said first layer thickness indication with said total thickness indication to provide a resultant indication of the combined thicknesses of said second layer and said tire cord, and
controlling the combined thicknesses of said second layer and said tire cord substantially to a second target in response to said resultant indication, the sum of said first layer target and said second target being equal to a desired total thickness target, whereby said total thickness is maintained substantially at said total thickness target.

9. The method of Claim 8, wherein the thickness of said laminated strip is measured at a plurality of points across the width of said strip, and averaging the measurements from the plurality of points to provide an indication of the average total thickness of said strip.

10. The method of Claim 8, wherein said first layer thickness is controlled at more frequent intervals than said total thickness is controlled.

11. Apparatus for automatically controlling a tire calender to maintain a desired thickness profile in a strip of laminated sheet material comprising first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said apparatus comprising
first measuring means located in a fixed position adjacent one of said adjoining calender rolls at the input side thereof for providing an indication of the thickness of said first layer of rubber,
first comparison means for comparing said first layer thickness indication with a first layer target to provide a first layer error indication,
first controller means responsive to said first layer error indication for actuating said adjustable elements associated with said first pair of coacting calender rolls, to maintain said first layer thickness substantially at said first layer target,
second measuring means located at the strip output side of said adjoining calender rolls for providing an indication of the total thickness of said strip,
combining means responsive to said indications provided by first and second measuring means for providing a control signal representing the change in thickness of said second layer required to maintain the total thickness of said strip at a total thickness target, and
second controller means responsive to said control signal for actuating said adjustable elements associated with said second pair of coacting calender rolls, to maintain said total thickness substantially at said total thickness target.

12. Apparatus according to Claim 11, wherein the first controller means is substantially instantaneously responsive to the indication derived from the first measuring means and further including means for traversing said second measuring means in a direction between the edges of said strip and means for deriving the indication of total thickness as an indication of the average total thickness across at least a significant portion of the width of said strip.

13. In a system for controlling the thicknesses of first and second layers respectively applied on opposite first and second sides of a moving substrate sheet of known thickness, said layers being applied to the first and second sides of the sheet by first and second applicator stations, means downstream of both stations for measuring the total thickness of the substrate and the two applied layers, means upstream of one of the stations for measuring the thickness of the first layer prior to the first layer being applied to the sheet, means responsive to the upstream measuring means for deriving a control signal for the thickness of the first layer in response to the measured thickness of the first layer exclusively of any indication of the thickness of the second layer, and means responsive to both of the measuring means for deriving a control signal for the thickness of the second layer in response to an algebraic combination of the measured total thickness and the measured thickness of the first layer.

14. The system of claim 13 further including means for scanning the total measuring means in a direction between the sheet edges, means for averaging the measurement derived from the scanning gauge means over at least a significant portion of the scan interval and for deriving the control signal for the second layer after the scan interval has been completed, said means for deriving the control signal for the first layer including means for deriving the first layer contol signal a plurality of times during a scan.

15. The system of claim 14 wherein the measuring means for the first layer is maintained stationary while the scanning gauge is scanned.

16. A method of controlling the thicknesses of first and second layers respectively applied on opposite first and second sides of a moving substrate sheet of known thickness, said layers being applied to the first and second sides of the sheet by first and second applicator stations, comprising measuring the total thickness of the substrate and the two applied layers downstream of both stations, measuring the thickness of the first layer prior to the first layer being applied to the sheet, controlling the thickness of the first layer in response to the measured thickness of the first layer exclusively of any indication of the thickness of the second layer, and controlling the thickness of the second layer in response to an algebraic combination of the measured total thickness and the measured thickness of the first layer.

17. The method of claim 16 wherein the total thicknens measurement is performed by scanning a total thickness measuring gauge in a direction between the sheet edges, averaging the measurement derived from the scanning gauge over at least a significant portion of the scan interval, performing the control action for the second layer in response to the averaged measurement, and performing the control action for the first layer more often than the control action for the second layer.

18. A method in accordance with claim 17 further including conducting the measurement of the first layer at the same cross sheet location while the gauge is scanned.

19. In a system for automatically controlling a tire calender to maintain a desired thickness profile in a strip of laminated sheet material having first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said system comprising means downstream of both of said pairs of calender rolls for measuring the total thickness of all three of said layers, means located adjacent one of said adjoining calender rolls at the input side thereof for measuring the thickness of said one rubber layer prior to the one rubber layer being laminated onto the cord layer, means responsive to the one thickness measuring means for deriving a control signal for the thickness of the first layer in response to the measured thickness of the first layer exclusively of any indication of the thickness of the second layer, and means responsive to both of the measuring means for deriving a control signal for the thickness of the second layer in response to an algebraic combination of the measured total thickness and the measured thickness of the first layer.

20. The system of claim 19 further including means for scanning the total measuring means in a direction between the sheet edges, means for averaging the measurement derived from the scanning gauge means over at least a significant portion of the scan interval and for deriving the control signal for the second layer after the scan interval has been completed, said means for deriving the control signal for the first layer including means for deriving the first layer control signal a plurality of times during a scan interval.

21. The system of claim 20 wherein the measuring means for the first layer is maintained stationary while the scanning gauge is scanned.

22. A method of controlling a tire calender to maintain a desired thickness profile in a strip of laminated sheet material including first and second layers of rubber and an intermediate layer of tire cord, in which said first layer of rubber is formed in a substantially continuous fashion between a first pair of coacting calender rolls having adjustable elements at either end thereof for adjusting the spacing between said first pair of rolls to vary the thickness of said first layer of rubber, and said second layer of rubber is formed in a substantially continuous fashion between a second pair of coacting calender rolls having adjustable elements at either end thereof for adjusting the spacing between said second pair of rolls to vary the thickness of said second layer of rubber, and in which said layer of tire cord is laminated between said first and second layers of rubber by adjoining calender rolls, said method comprising measuring the total thickness of all three layers downstream of both of the pairs of calender rolls, measuring the thickness of said one rubber layer immediately prior to the one layer being laminated onto the cord layer while the rubber is on one of the rolls of the first pair, controlling the thickness of the first layer in response to the measured thickness of the first layer exclusively of any indication of the thickness of the second layer, and controlling the thickness of the second layer in response to an algebraic combination of the measured total thickness and the measured thickness of the first layer.

23. The method of claim 22 wherein the total thickness measurement is performed by scanning a total thickness measuring gauge in a direction between the sheet edges, averaging the measurement derived from the scanning gauge over at least a significant portion of the scan interval, performing the control action for the second layer in response to the averaged measurement, and performing the control action for the first layer a plurality of times during a scan interval.

24. A method in accordance with claim 23 further including conducting the measurement of the first layer at the same cross sheet location while the gauge is scanned.

References Cited

UNITED STATES PATENTS

| | | | |
|---|---|---|---|
| 2,750,986 | 6/1956 | Russell et al. | 156—360 X |
| 3,562,500 | 2/1968 | Grant | 235—151.3 |
| 3,610,897 | 10/1971 | Gerhard | 235—151.3 |
| 3,515,860 | 6/1970 | Fitzgerald, Jr. | 235—151.13 |
| 3,006,225 | 10/1961 | Mamas | 80—56 |
| 3,067,939 | 12/1962 | Ziffer | 235—151.3 |
| 3,190,261 | 6/1965 | Ziffer | 250—360 |
| 3,292,208 | 12/1966 | Wood | 425—141 |
| 3,378,676 | 4/1968 | Clement | 235—151.3 |
| 3,405,267 | 10/1968 | Chope | 250—308 |
| 3,307,215 | 3/1967 | Gerhard | 425—141 |
| 3,510,374 | 5/1970 | Walker | 425—141 |
| 3,531,827 | 10/1970 | Dragonette | 425—141 |
| 3,566,092 | 2/1971 | Grant | 235—151.3 |
| 3,599,288 | 8/1971 | Eakman | 425—141 |
| 3,609,318 | 9/1971 | Anderson | 235—151.3 |
| 3,635,627 | 1/1972 | Palmer | 425—141 |
| 1,969,232 | 8/1934 | Nixon | 156—243 X |
| 3,159,516 | 12/1964 | Harris | 156—243 |

FOREIGN PATENTS

| | | | |
|---|---|---|---|
| 940,383 | 10/1963 | Great Britain | 156—360 X |

CLIFTON B. COSBY, Primary Examiner

U.S. Cl. X.R.

156—394, 405, 360; 118—8; 235—151.3, 151.13; 250—360; 425—141